United States Patent
Stürmer et al.

(10) Patent No.: US 11,478,881 B2
(45) Date of Patent: Oct. 25, 2022

(54) OPTICAL MODULE HAVING A DEVICE FOR AUTOMATICALLY CHANGING A COLLIMATION OPTIC

(71) Applicant: SAUER GmbH, Stipshausen (DE)

(72) Inventors: Udo Stürmer, Pfronten (DE); Andreas Abt, Oy-Mittelberg (DE)

(73) Assignee: SAUER GmbH, Stipshausen (DE)

( * ) Notice: Subject to any disclaimer, the term of this patent is extended or adjusted under 35 U.S.C. 154(b) by 191 days.

(21) Appl. No.: 16/645,566

(22) PCT Filed: Sep. 7, 2018

(86) PCT No.: PCT/EP2018/074131
§ 371 (c)(1),
(2) Date: Mar. 9, 2020

(87) PCT Pub. No.: WO2019/048608
PCT Pub. Date: Mar. 14, 2019

(65) Prior Publication Data
US 2020/0276673 A1     Sep. 3, 2020

(30) Foreign Application Priority Data

Sep. 7, 2017   (DE) .................... 10 2017 215 839.5

(51) Int. Cl.
*B23K 26/70*     (2014.01)
*B22F 12/00*     (2021.01)
(Continued)

(52) U.S. Cl.
CPC ............ *B23K 26/703* (2015.10); *B22F 12/00* (2021.01); *B23K 26/0648* (2013.01);
(Continued)

(58) Field of Classification Search
CPC .............. B23K 26/0648; B23K 26/703; B23K 26/144; B23K 26/1462; G02B 7/028; G02B 7/16; G02B 7/1815; G02B 7/14
(Continued)

(56) References Cited

U.S. PATENT DOCUMENTS 7,602,563 B2 * 10/2009 Bloch .................. H04N 5/2256
219/121.67
8,553,322 B2 * 10/2013 Niv ........................ G02B 21/28
359/381
(Continued)

FOREIGN PATENT DOCUMENTS

CN     101909805 A    12/2010
CN     103534056 A     1/2014
(Continued)

OTHER PUBLICATIONS

Machine English Translation of DE-202004013136-U1 (Year: 2005).*
(Continued)

*Primary Examiner* — Tu B Hoang
*Assistant Examiner* — Erwin J Wunderlich
(74) *Attorney, Agent, or Firm* — Oliff PLC

(57) ABSTRACT

An optical module for a machine for machining workpieces and/or for producing molded bodies by way of location-selective solidification of material powder into contiguous regions by a laser beam includes a housing for releasably fastening the optical module to the machine and a collimation optics changer releasably arranged in the housing, having at least two collimation optics which can be moved into a beam path of the laser beam for collimating the laser beam. The collimation optics changer has a mechanism for automatically changing the collimation optics.

8 Claims, 12 Drawing Sheets

(51) Int. Cl.
  *G02B 7/16* (2021.01)
  *G02B 7/14* (2021.01)
  *B23K 26/06* (2014.01)
  *G02B 7/02* (2021.01)
  *B23K 26/144* (2014.01)
  *B23K 26/14* (2014.01)
  *G02B 7/18* (2021.01)

(52) U.S. Cl.
  CPC ........ *B23K 26/144* (2015.10); *B23K 26/1462* (2015.10); *G02B 7/14* (2013.01); *G02B 7/16* (2013.01); *G02B 7/1815* (2013.01); *G02B 7/028* (2013.01)

(58) Field of Classification Search
  USPC ...................................................... 219/121.6
  See application file for complete search history.

(56) References Cited

U.S. PATENT DOCUMENTS

| | | | |
|---|---|---|---|
| 9,520,693 B2 * | 12/2016 | Matsumoto | B23K 26/046 |
| 2010/0072180 A1 * | 3/2010 | Schuermann | B23K 26/703 |
| | | | 219/121.67 |
| 2010/0135356 A1 | 6/2010 | Schulz | |
| 2014/0072003 A1 | 3/2014 | Matsumoto | |
| 2015/0140230 A1 * | 5/2015 | Jones | B23K 26/0876 |
| | | | 427/532 |
| 2017/0057009 A1 * | 3/2017 | Burger | B23K 26/0648 |
| 2017/0136578 A1 | 5/2017 | Yoshimura | |
| 2020/0189029 A1 * | 6/2020 | Ishiguro | B23K 26/0734 |

FOREIGN PATENT DOCUMENTS

| | | | | |
|---|---|---|---|---|
| DE | 196 30 147 A1 | 1/1998 | | |
| DE | 202004013136 U1 * | 7/2005 | ............... | G02B 6/32 |
| DE | 10 2008 048 323 B3 | 12/2009 | | |
| DE | 20 2009 012 924 U1 | 1/2010 | | |
| DE | 10 2009 046 485 A1 | 5/2011 | | |
| DE | 10 2013 224 649 A1 | 6/2015 | | |
| DE | 10 2014 209 308 A1 | 11/2015 | | |
| DE | 10 2015 222 689 A1 | 5/2017 | | |
| EP | 2 052 845 A2 | 4/2009 | | |
| EP | 2 062 676 A1 | 5/2009 | | |
| EP | 2 062 679 A1 | 5/2009 | | |
| EP | 2 399 703 A1 | 12/2011 | | |
| EP | 2 711 121 A1 | 3/2014 | | |
| EP | 3 127 685 A1 | 2/2017 | | |
| JP | 2003181671 A * | 7/2003 | ............ | B23K 26/06 |
| JP | 2005-193249 A | 7/2005 | | |
| WO | 2017/139769 A1 | 8/2017 | | |

OTHER PUBLICATIONS

Machine English Translation of JP2003181671A (Year: 2003).*
Jan. 25, 2021 Office Action issued in German Patent Application No. 10 2017 215 839.5.
Jul. 21, 2021 Office Action issued in Chinese Patent Application No. 201880065406.4.
Nowotny et al.; "Laser-Einheit macht Auftragschweißen auf Bearbeitungszentrum möglich (Laser unit powers deposition welding on machining centre possible);" MM Das Industriemagazin; 2009; pp. 42-44; vol. 17.
Oct. 29, 2018 Search Report issued in International Patent Application No. PCT/EP2018/074131.
Oct. 29, 2018 Written Opinion of the International Searching Authority issued in International Patent Application No. PCT/EP2018/074131.
Jun. 10, 2021 Office Action issued in European Patent Application No. 18 768 841.1.
Apr. 11, 2022 Office Action issued in Chinese Patent Application No. 2018800656406.4.

* cited by examiner

OPTICAL MODULE HAVING A DEVICE FOR AUTOMATICALLY CHANGING A COLLIMATION OPTIC

The present invention relates to an optical module for a machine for machining workpieces and/or for producing molded bodies by location-selective solidification of material powder to form connected regions by means of a laser beam. The invention relates in particular to an optical module for a machine for the production of molded bodies according to the principle of selective laser melting, selective laser sintering or laser deposition welding. In particular, material powders made of metal, plastic or ceramic can be used. Furthermore, the optical module according to the invention can also be used, for example, in a machine for laser welding, laser drilling, laser hardening or laser cutting. In the following, the term laser machine tool or simply machine will be used to summarize the different types of machines for machining/finishing/producing a workpiece or a molded body with a laser beam.

BACKGROUND

With the method of selective laser melting, laser sintering or laser deposition welding, molded bodies, such as machine parts, tools, prostheses, pieces of jewelry, etc., can be produced or processed in accordance with the geometry description data of the corresponding molded bodies, for example, by layered construction from a metallic or ceramic material powder or from a plastic powder. In the manufacturing process, the material powder is heated by a focused laser beam in a predetermined area corresponding to a selected cross-sectional area of the model of the molded body so that the material powder is remelted in the irradiated areas to form connected solidified regions. A protective gas can prevent oxidation during the build-up process. After cooling, a layer of material is formed which can be mechanically processed.

For the state of the art in the field of selective laser melting, reference is made to DE 10 2015 222 689 A1, for example. Furthermore, a laser machine tool of the type mentioned above is known from EP 2 052 845 A2, for example. A machine tool for cladding is described, for example, in the patent application DE 10 2013 224 649 A1. The German patent application DE 196 30 147 A1 describes a connection head for machining a workpiece by means of a laser beam, which comprises an automatic focusing lens changing mechanism configured as a turret.

The article "Laser-Einheit macht Auftragsschweißen auf Bearbeitungszentrum möglich" (*Laser unit makes cladding on machining centers possible*) by Nowotny et al. in the magazine "MM Das Industriemagazin", 17/2009, page 42 et seq. describes a laser processing optics which is inserted into the milling spindle of a CNC machine via a steep taper. Weld metal (material powder) is fed into the laser focal point through a powder nozzle. The workpiece can be milled in the same machine.

Patent application US 2017/0136578 A1 describes a machine for building up a layered three-dimensional molded body by melting a material powder. The material powder is fed through a powder nozzle fixed to a laser processing head to an operating point where it is melted by a laser beam which is guided through the powder nozzle. The machine comprises a powder nozzle changing unit which replaces the powder nozzle fixed to the laser processing head.

From the European patent application EP 2 062 679 A1, a processing head for a laser machining machine is known, which has a stationary part in the form of a laterally open housing which encloses a space for a changing module, which can be separated as a whole from the stationary part of the processing head without having to dismantle the stationary part into individual parts. The changing module comprises a focusing optics which is movable coaxially to the laser beam, and a measuring device for determining the position of the focusing optics.

A laser machine tool is usually operated with a laser that provides a laser beam with an output power of several hundred to several thousand watts, usually in continuous wave (CW) operation. The energy transfer from the laser beam to the material powder can be particularly decisive for the machining process. This is influenced on the one hand by the absorption capacity of the material powder and on the other hand by the intensity of the laser beam. In addition to the absolute laser power, the beam diameter thus determines the melting process. The beam diameter of the laser beam is usually determined by the focal length of a focusing optics and by the beam diameter of the collimated laser beam in front of the focusing optics. The beam diameter of the collimated laser beam can be determined in particular by the focal length of a collimation optics. Thus, the beam diameter of the focused laser beam, or the waist of a Gaussian laser beam, can be adjusted by suitable selection of the collimation optics without changing the focal length of the focusing optics.

According to the state of the art, essentially two types of machines are known for the machining of workpieces and/or for the production of molded bodies by location-selective solidification of material powder to form connected regions by means of a laser beam, in particular by selective laser melting or selective laser sintering. The machine types differ, inter alia, in the way the material powder is provided. In a first type of machine, a powder bed is built up in layers. On a second type of machine, the material powder is provided by means of a powder nozzle at the location of processing. The present invention relates in particular to machines in which the laser beam is provided by means of a laser processing head. The mechanical setup for moving the laser processing head and/or the workpiece can be done, for example, as in a known five-axis machining center, wherein the laser processing head is provided instead of a mechanical tool. For some years now, machine tools have also been available on the market that allow both laser machining and metal cutting, for example with a milling tool. In such hybrid machining centers, the laser processing head can be attached to the tool spindle holder.

The laser processing head can include a plurality of optical components for manipulating the laser beam, such as collimating, focusing, deflecting, monitoring, switching and/or modulating the laser beam or the power of the laser beam. It has proven to be advantageous to combine as many optical components as possible in an optical module pre-assembled as an exchangeable component, which can be releasably attached to the machine by suitable means, in particular to a setting axis of the machine. This can simplify and speed up the maintenance of a laser machine tool, so that the machine can be used more efficiently by reducing the idle time of the machine.

SUMMARY

The object underlying the present invention is to provide an optical module which, on the one hand, can be exchanged quickly and easily and, on the other hand, allows to adjust the intensity of a laser beam for processing a workpiece or for producing a molded body according to the respective requirements.

The problem is solved by an optical module for a machine for machining workpieces and/or for producing molded bodies by location-selective solidification of material powder to form connecting regions by means of a laser beam. The optical module comprises a housing with means for releasably attaching the optical module to the machine and a collimation optics changer releasably arranged in the housing and having at least two collimation optics movable into a beam path of the laser beam for collimating the laser beam. According to the invention, the collimation optics changer has a mechanism for automatically changing the collimation optics.

In particular, the collimation optics can be automatically changed during a machining process so that the diameter of the laser beam at the operating point and accordingly the intensity of the laser beam at the operating point can be automatically adjusted during the machining process. Since the collimation optics changer comprises a mechanism for automatically changing the collimation optics, the change of the collimation optics can be integrated into the machining process without the need for a manual step. The operating point of the laser beam usually corresponds to the focal point of the focused laser beam. The at least two collimation optics can each include at least one collimation lens. The collimation optics can also comprise a plurality of lenses. With a collimation optics with a combination of several lenses, imaging errors, for example due to spherical aberration and/or astigmatism, can be compensated.

The collimation optics are used to collimate a divergent laser beam coupled into the optical module. For example, the laser beam can be coupled into the optical module by means of an optical fiber. The optical module may therefore comprise means for connecting an optical fiber, in particular a fiber coupler. Since an optical fiber can transport laser light over many meters, it is possible to place the laser in a protected location remote from the process chamber. The distance between the collimation optics and the end of the optical fiber is approximately equal to the focal length of the collimation optics. The collimated laser beam can be focused to a focal point by a focusing optics fixed to the optical module. The laser beam thus leaves the optical module as a focused beam. The focusing optics may include at least one focusing lens. The focusing optics can also include a plurality of lenses. With a focusing optics with a combination of several lenses, imaging errors, for example due to spherical aberration and/or astigmatism, can be compensated.

Optical components of laser machine tools can be subject to increased wear due to the relatively high laser power. On the other hand, in particular in the case of a hybrid machine, which can perform both laser machining and metal-cutting production processes, optical components can be subject to contamination, for example by coolant, dust, chips and other particles. Furthermore, the material powder can contribute to the contamination of optical components. Dirt particles deposited on an optical component can lead to a high thermal effect on the optical component and thus to its damage, in particular at high laser powers. Therefore, it is desirable that optical components can be exchanged quickly and easily in case of damage or contamination. On the one hand, this is achieved by the fact that the entire optical module can be releasably attached to a setting axis as a pre-assembled assembly and can thus be easily exchanged. On the other hand, exchangeable optical components allow quick exchange without removing the entire optical module. The collimation optics changer, for example, allows quick automatic change of the collimation optics without having to exchange the entire collimation changer or the optical module.

The optical components arranged in the optical module can each be releasably attached in or on the housing of the optical module. On the one hand, this allows the optical components to be changed automatically during operation of the machine. On the other hand, an optical module that needs maintenance can be brought back into an operational state by exchanging individual optical components. For example, the collimation changer can be releasably attached as an exchangeable module in the housing of the optical module and thus be exchanged during maintenance of the optical module.

Preferred configurations and further developments, which can be used individually or in combination with each other, are the subject matter of the dependent claims.

The collimation optics changer can comprise a turret with a plurality of collimation optics. The collimation optics can be arranged around a common driven axis of rotation of the turret so that an automatic lens change can be performed by turning the turret. The drive of the collimation optics changer causes the collimation optics to rotate around the common axis of rotation of the turret. This allows the realization of a compact collimation optics changer with a plurality of collimation optics to be implemented in a preferred manner. In particular, the collimation optics are arranged in such a way that their axis of symmetry in each case is parallel to the driven axis of rotation of the turret. Furthermore, depending on their focal length, the collimation optics are arranged at a corresponding position along the direction of the laser beam so that they collimate a diverging laser beam. In particular, the suitable distance of the collimation optics to a fiber coupler corresponds approximately to the focal length of the collimation optics.

As an alternative to a turret, the collimation optics changer can have a shifting system with driven carriages, whereby the collimation optics are arranged in parallel planes according to their focal length and can be moved into the beam path of the laser beam or out of the beam path of the laser beam by shifting. In this way, a compact collimation optics changer with a variety of collimation optics can also be realized.

In a preferred optical module, the collimation optics changer has means for cooling the collimation optics. By cooling the collimation optics, damage to the lenses due to heat transfer from the laser beam to the lenses can be avoided as far as possible. Thus, cooling can increase the service life of the lenses. Furthermore, heating a lens can cause a change in the lens shape, which can have an effect on the focal length of the lens. Such effects can be reduced by cooling the lenses. In particular, the effect of the thermal lens can be reduced.

In a preferred configuration of the optical module, the collimation optics changer comprises means for measuring the temperature of the collimation optics. In particular, the temperature can be measured using a temperature sensor such as an NTC resistor, which can output a measured value to a machine control. Together with the means for cooling the collimation optics, the temperature of the collimation optics can be controlled to a set value. If the collimation optics are operated at a predefined temperature, an influence of temperature on the optical properties of the lenses can at least be kept constant.

The optical module preferably comprises means for fastening an automatically exchangeable focusing module. For example, the focusing module can be connected to the optical module via at least two clamping bolts. The optical module can comprise corresponding holders for the clamping bolts. In particular, the holders can be configured as electromagnetically, hydraulically or pneumatically operated clamping mechanisms or as clamping mechanisms tensioned by a spring. The optical module may also comprise means for monitoring the temperature of the focusing optics or a protective glass of the focusing optics. By providing means for fastening an automatically exchangeable focusing module, the focusing optics can be changed automatically. This can then be exchanged fully automatically during the manufacturing or machining process, similar to a tool on a machining center. By automatically changing the focusing optics and collimation optics, the beam diameter of the laser beam in the focus can be adjusted within a wide range according to requirements. The clamping bolts allow the focusing module to be quickly and securely fastened to the optical module. Furthermore, the clamping bolts ensure that the focusing module can be fastened to the optical module with a high positional accuracy.

A focusing module preferably comprises an essentially cylindrical carrier with a circular cross-section, made of a metal or metal alloy, for example. A focusing optics is arranged in the carrier. Preferably, the focusing optics can be releasably attached in the carrier of the focusing module so that the focusing optics can be exchanged. The focal length of the focusing optics can be several hundred millimeters, for example. The focusing optics can be a common converging lens or a combination of several lenses. The focusing module preferably comprises means for measuring the temperature of the focusing optics. It is also preferred that the focusing module comprises means for cooling the focusing optics.

The focusing module may have at least one protective glass to protect the focusing optics from contamination. The protective glass can also protect against mechanical effects on the focusing optics. The protective glass is preferably attached releasably in the carrier of the focusing module. When contaminated, the protective glass can be exchanged. Preferably, a protective glass is arranged on both sides of the focusing optics in the axial direction in the carrier of the focusing module so that the focusing optics are protected from contamination from both sides. The focusing module may also comprise means for measuring the temperature of at least one protective glass. Thus, contamination of a protective glass can be detected, for example, by a rise in temperature.

The optical module may further comprise means for mounting an automatically exchangeable powder nozzle. For example, the powder nozzle can be connected to the optical module by at least two clamping bolts. For this purpose, the optical module can have corresponding holders for the clamping bolts. The holders can have a clamping mechanism which can be a hydraulically or pneumatically operated mechanism or a mechanism tensioned by a spring. The clamping bolts allow the powder nozzle to be fastened quickly and securely to the optical module. Furthermore, the clamping bolts ensure that the powder nozzle can be mounted to the optical module with a high degree of positional accuracy.

The powder nozzle can be designed in a one-piece or multi-piece construction. In a multi-part construction, the powder nozzle may comprise a powder nozzle flange on which the means for fastening the powder nozzle to the optical module, for example, at least two clamping bolts, are arranged. The powder nozzle flange may also have interfaces for supplying protective gas, carrier gas, coolant, and/or material powder. The powder nozzle flange can preferably be arranged at a central section configured as a carrier for a powder nozzle tip. The powder nozzle tip can be releasably attached to the central section of the powder nozzle so that the powder nozzle tip can be exchanged.

The powder nozzle comprises at least one channel for material powder, especially in the middle section, to transport the material powder to the focal point of the laser. Preferably, the powder nozzle comprises at least two or three or four or more material powder channels, which may also be branched in order to guide the material powder as uniformly as possible to the laser focal point. The branching of the material powder channels or the coaxial guidance of the material powder is carried out particularly in a tip of the powder nozzle. For this purpose, the powder nozzle tip can comprise an annular gap which causes the material powder to be distributed evenly along an annular opening formed coaxially to the laser beam. Preferably, the material powder is guided from the material powder channels into the annular gap via a large number of openings in order to guide the material powder into the annular gap in as even a distribution as possible.

The channels for the material powder can also be used to supply a protective or carrier gas. The protective or process gas serves to prevent a reaction of the heated material powder with atmospheric oxygen. Furthermore, the protective gas can act as a carrier gas to transport the material powder. The material powder is then carried along by the flow of the carrier gas and carried through the material powder channels to the operating point at the focus of the laser beam. As protective or carrier gas, inert gases such as argon are particularly suitable. The more material powder channels are provided in the powder nozzle, the higher the flow rate of the material powder can be. In order to guide the material powder as uniformly as possible to the focal point of the laser beam, a configuration with at least three or four material powder channels has proven to be advantageous. Optionally, the powder nozzle can comprise a plurality of different material powder channels with different diameters for different powder grains.

The optical module can include a plurality of interfaces to feed material powder from lines for the material powder arranged on the optical module into the material powder channels of the powder nozzle. The interfaces can, for example, be configured as inlet openings on a flange for fastening the powder nozzle. The inlet openings may include sealants for gas-tight sealing when attaching the powder nozzle to the optical module. The inlet openings may comprise means for aligning the inlet openings with the lines on the optical module.

The powder nozzle may comprise cooling channels for a fluid coolant to cool the powder nozzle. In order to supply the powder nozzle with the coolant, the optical module can have appropriate lines. Preferably, the optical module comprises at least one coolant supply and one coolant return. The powder nozzle preferably comprises at least two couplings as releasable interfaces between the coolant supply and the coolant return of the optical module and the coolant channels of the powder nozzle. The couplings can, for example, be configured as quick couplings that can be connected to corresponding counterparts on the optical module.

By providing means for the releasable mounting of an automatically exchangeable powder nozzle, the powder nozzle can be changed automatically. This can then be exchanged fully automatically like a tool of a machining center during the manufacturing or machining process.

The optical module can further comprise a camera for monitoring the machining process. The viewing direction of the camera can, for example, be superimposed on the beam path of the laser by means of a dichroic mirror so that the camera can view the operating point along the laser beam and monitor the process. In particular, the dichroic mirror can be cooled and temperature monitored.

The beam path through the optical module is preferably sealed gas-tight so that a sealing gas atmosphere can be maintained. In particular, inert gases such as nitrogen or argon can be used as sealing gas. It is important that the sealing gas is free of particles that could contaminate the optical components. Preferably, the entire housing of the optical module is sealed gas-tight. To create the sealing gas atmosphere in the housing of the optical module, the optical module preferably comprises appropriate gas supply lines and/or means for connecting supply lines. Instead of sealing the housing gas-tightly, the housing can also be constructed in such a way that it is possible to create a slight overpressure in the housing by feeding in the sealing gas so that dust or material powder particles cannot get into the interior of the optical module.

A preferred optical module comprises means for connecting feeders for a process gas. The process gas can prevent oxidation of the workpiece by reaction with atmospheric oxygen. The process gas can also serve as a carrier gas for conveying the material powder. The optical module preferably has lines for the process gas in order to guide it via suitable interfaces with channels in a powder nozzle to the focal point of the laser beam (operating point). In particular, inert gases such as argon or nitrogen can be used as suitable process gases. In particular, the process gas is guided to the operating point via the powder nozzle.

Preferably, the collimation optics each have at least one protective glass to protect the collimation optics from contamination. The protective glass is arranged in the beam path before and/or after the collimation optics. To avoid disturbing reflections back into the laser, the protection glass can comprise an anti-reflection coating and/or be arranged with a small angle to the beam direction. In case of contamination or damage to the protective glass, it can be removed and exchanged. Thus, the collimation optics can be protected effectively and easily against contamination and damage.

In a preferred configuration of the optical module, the collimation optics changer has at least three, more preferably at least four, or at least five collimation optics. The more collimation optics are arranged in the collimation changer, the more different focal lengths can be provided so that more different beam diameters can be provided. In addition to collimation optics with different focal lengths, several identical collimation optics can also be provided so that, if one collimation optics or protective glass becomes contaminated or damaged, it can be exchanged with a ready-to-use collimation optics without the need for manual maintenance of the optical module. This increases the versatility of the machine and reduces the need for maintenance. For example, a collimation lens, especially a converging lens, can be used as a collimation optics.

BRIEF DESCRIPTION OF DRAWINGS

Further preferred configurations are described in more detail below by means of an embodiment shown in the drawings, to which the invention is not limited.

It is shown schematically by.

DETAILED DESCRIPTION OF THE INVENTION BY MEANS OF EMBODIMENTS

In the following description of a preferred embodiment of the present invention, identical reference signs denote identical or comparable components.

Figure 1:
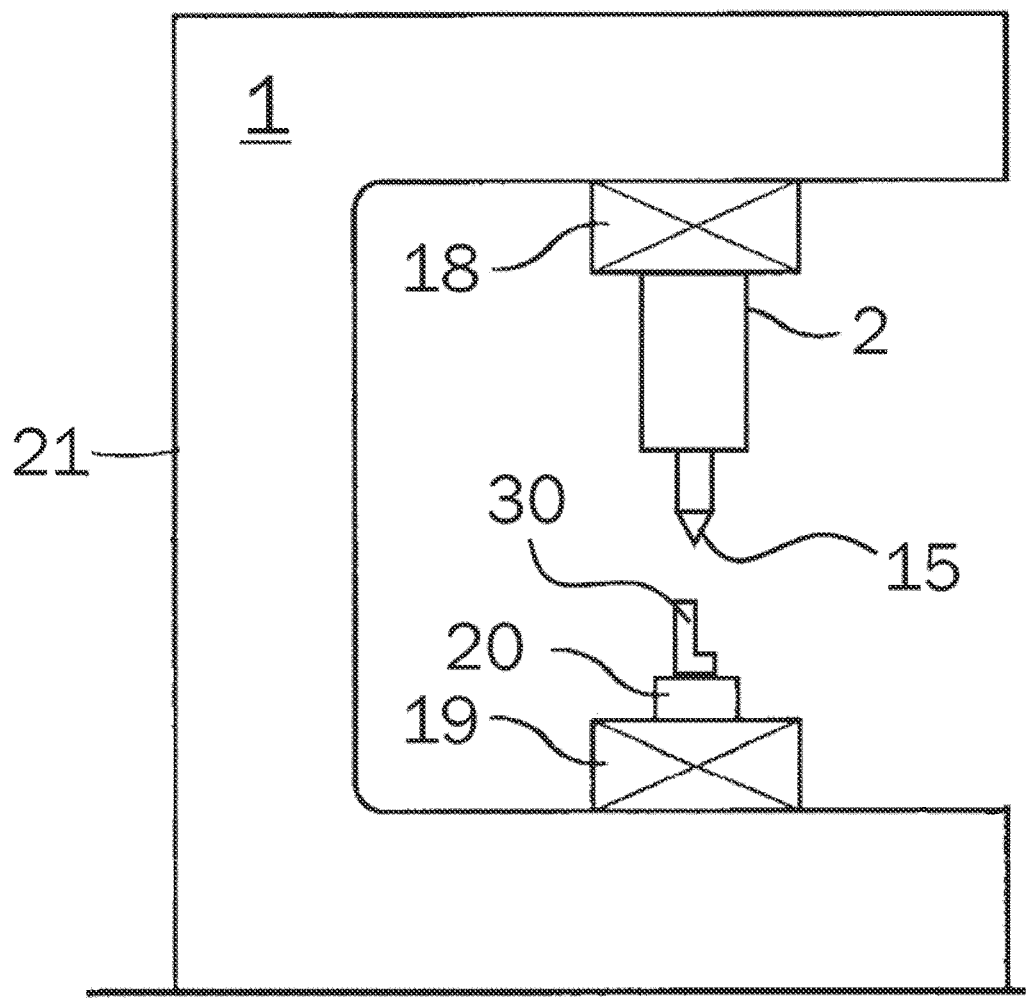
FIG. 1: a machine tool with an optical module for producing or machining a molded body or workpiece by means of laser radiation.

FIG. 1 shows a schematic view of a machine 1 for machining a workpiece 30 and/or for producing a molded body 30 by location-selective solidification of material powder to form connected regions by means of laser radiation. The machine 1 has a machine frame 21, to which a workpiece table 20 on the one hand and an optical module 2 according to the invention on the other hand are mounted indirectly via intermediate adjusting axes 18, 19. The adjusting axes 18, 19 can each have several translatory (X, Y, Z) or rotary ($\varphi$, $\lambda$, $\theta$) axes, which can be adjusted according to a machine control. The configuration can be such that, for example, the optical module 2 is mounted to the machine frame 21 via one, two or three translatory adjusting axes 18 (X and/or Y and/or Z), while the workpiece table 20 is attached to the machine frame 21 via one, two or three rotary adjusting axes 19. Such a laser machine tool 1 usually comprises a closed cabin (not shown), in which, for example, a protective gas atmosphere can be created and which shields the operating space from contamination.

On the workpiece table 20, a workpiece 30 can be releasably attached for machining. Alternatively, a molded body 30 can be built up layer by layer on the workpiece table 20 by location-selective hardening of material powder.

For example, the machine 1 can be a five-axis laser machine tool for the production of molded bodies by location-selective solidification of material powder to form connected regions by means of laser radiation. The optical module 2 is releasably attached to the adjustment axes 18 so that it can be exchanged quickly and easily if necessary, for example for maintenance. In such a five-axis laser machine tool, the optical module 2 is mounted to the machine frame 21 via three translatory adjusting axes 18 (X, Y and Z) and the workpiece table 20 is arranged on the machine frame 21 via two rotary axes.

Figure 7:
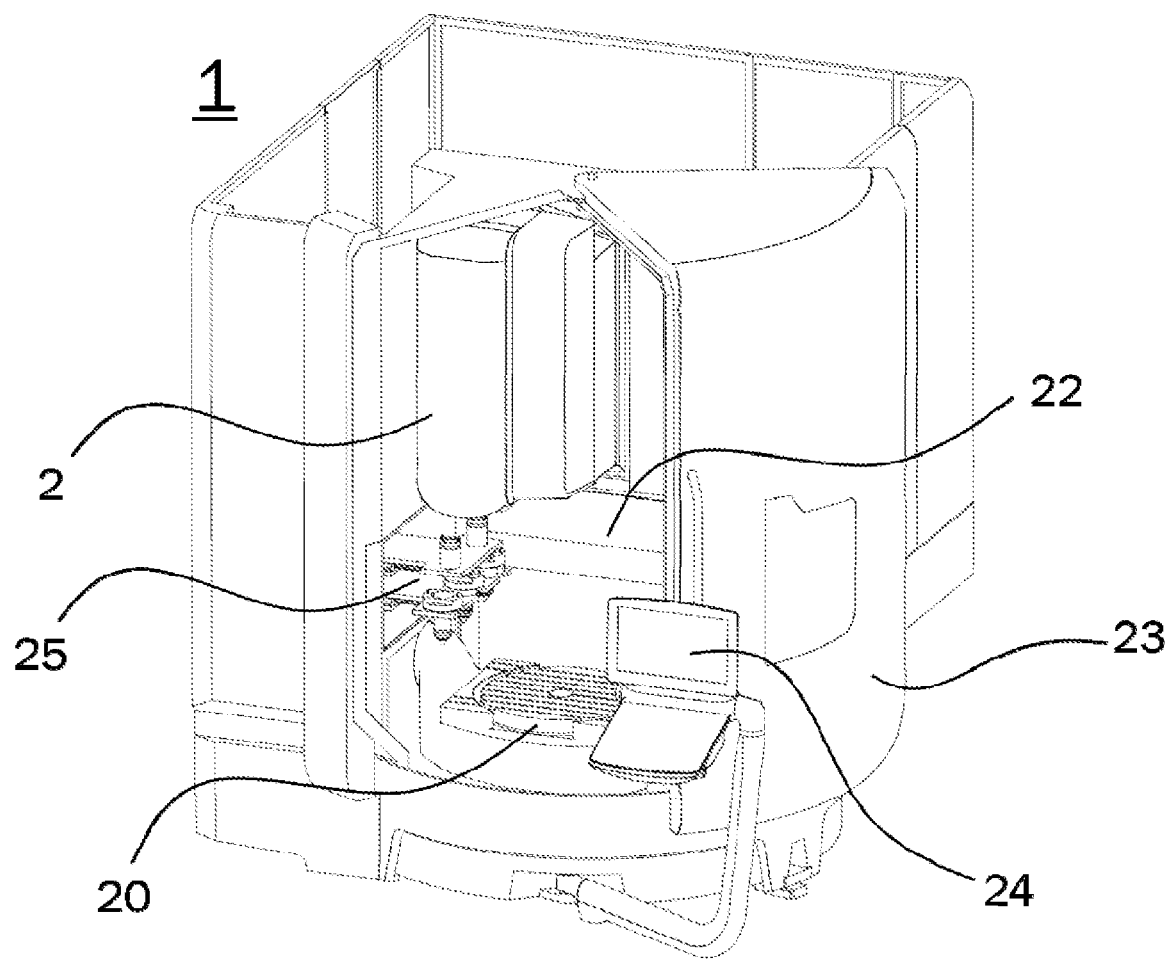
FIG. 7: a perspective view of an embodiment of a machine tool for manufacturing or machining a molded body or workpiece by means of laser radiation.

An exemplary illustration of a five-axis laser machine tool 1 for the production of molded bodies by location-selective hardening of material powder to form connected regions by means of laser radiation is shown in FIG. 7. The embodiment shown corresponds essentially to the machine 1 schematically shown in FIG. 1. The workpiece table 20 and the optical module 2 are arranged in a process chamber 22 which is essentially closed by a process chamber door 23. A display 24 arranged outside the process chamber 22 serves as an interface between user and machine control. On this display 24, for example, measured values and/or warning messages and/or control applications can be displayed.

Figure 8:
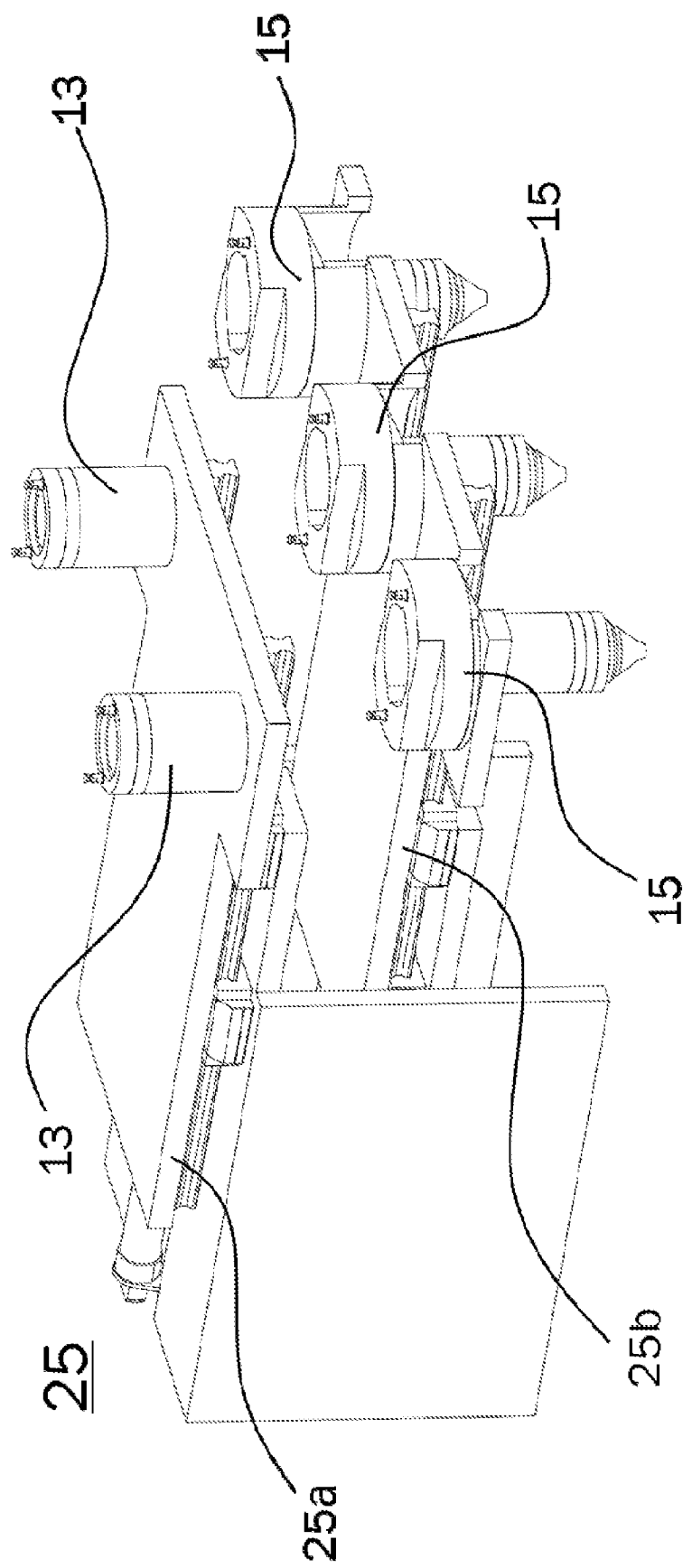
FIG. 8: a perspective view of a tool changer for a machine tool for producing or machining a molded body or workpiece by means of laser radiation.

The machine tool 1 comprises a tool changer 25, which can be moved laterally into the process chamber 22 by means of adjusting axes 25a, 25b. A detailed view of the tool changer 25 is shown in FIG. 8. A plurality of focusing modules 13 and a plurality of powder nozzles 15 can be arranged on the tool changer 25. The tool changer 25 shown in FIG. 8 comprises three depositing positions for powder nozzles 15 with different axial lengths. The tool changer 25 further comprises a depositing surface for at least two focusing modules 13 with focusing optics 14 of different focal length. By means of two adjusting axes 25a, 25b the focusing modules 13 and the powder nozzles 15 can be moved into the process chamber 22 so that they can be attached to the optical module 2. A method for changing the powder nozzles 15 or the focusing modules 13 is described below.

The tool changer 25 can be moved by means of the adjusting axes 25a, 25b into a tool chamber which can be separated from the process chamber 22 by means of a movable partition wall. In the tool chamber, the focusing modules 13 and the powder nozzles 15 are protected against contamination, for example by material powder or welding fumes, when machining the workpiece in the process chamber 22.

Figure 2:
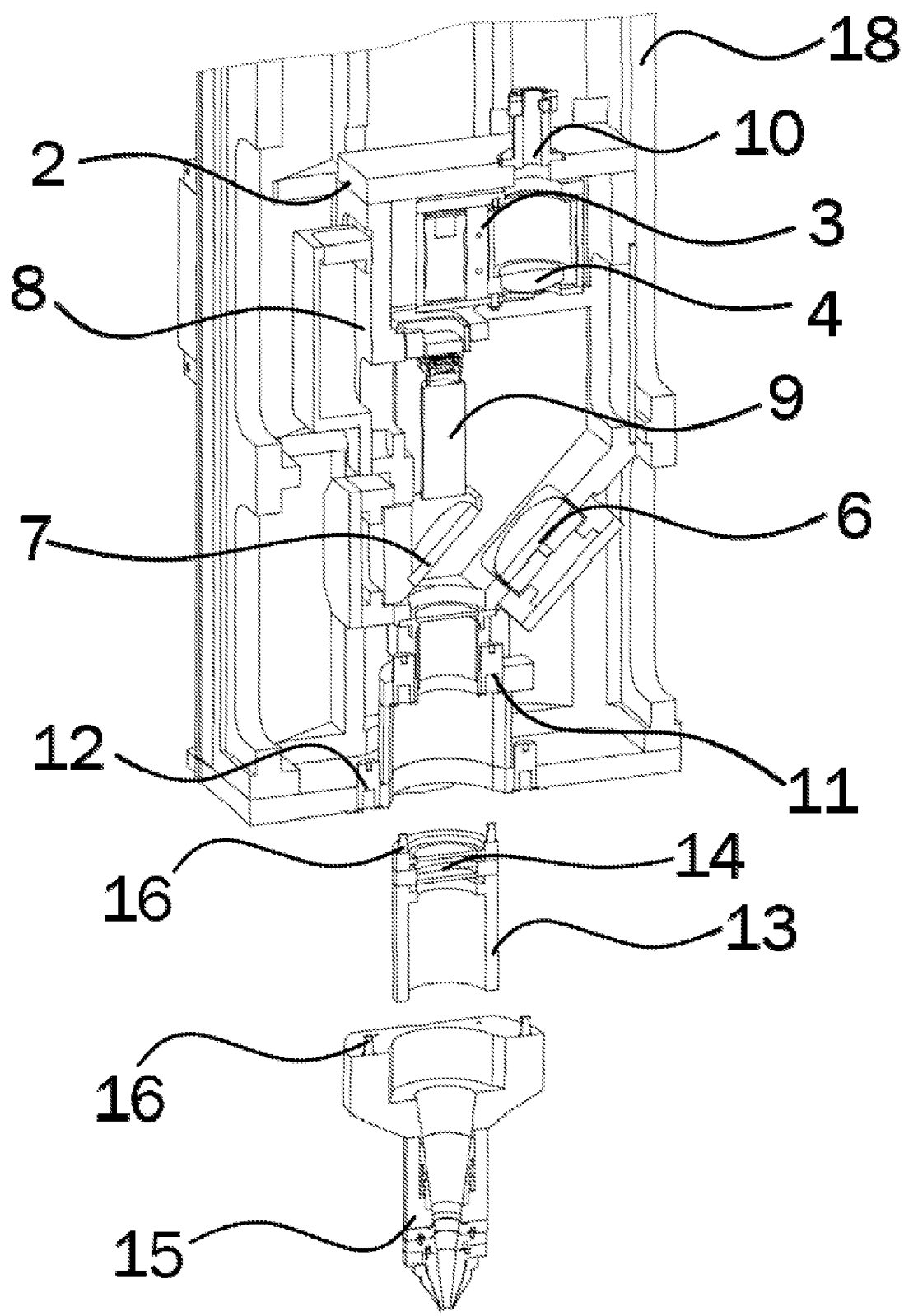
FIG. 2: a perspective sectional view of an embodiment of an optical module according to the invention.

FIG. 2 shows an embodiment of an optical module 2 according to the invention, which is releasably attached on an adjusting axis 18. The adjusting axis 18, for example, is a translation axis movable in the Z direction, which can be arranged on two further translation axes movable in the X and Y directions so that the optical module 2 can be moved in all three spatial directions. In particular, the optical module 2 is mounted on the adjustment axis 18 in such a way that the laser beam exits the optical module 2 vertically downwards (parallel to the direction of gravity or in the Z-direction). By moving the adjusting axes 18, a focus of the focused laser beam can thus be moved in three dimensions in space in order to machine a workpiece or to build up a molded body layer by layer. Thus, a molded body can be built up layer by layer in the same way as with a 3D printer by melting material powder.

The optical module 2 comprises a housing 8 in which a plurality of optical components are arranged. On the one hand, the housing 8 serves as a mechanical platform for arranging the optical components and for protecting the optical components from mechanical influences. A sealing gas atmosphere can be created in the housing 8. For example, overpressure can prevent particles and dirt from entering the housing.

A fiber coupler 10 is arranged at an upper part of the housing 8, via which a laser beam from an optical fiber can be coupled in. By using an optical fiber, laser light from a laser beam source can be reliably guided to the optical module 2. The flexible optical fiber allows the optical module 2, and thus the laser beam, to be moved without having to move the laser beam source itself. Furthermore, an optical fiber can provide a laser beam with a particularly uniform beam profile.

For example, a high-power solid-state laser can be used as a laser beam source. These include, for example, doped YAG lasers. In particular, a YAG disk laser doped with ytterbium with a wavelength of 1030 nm can serve as a laser beam source. Alternatively, a fiber-guided diode laser with a wavelength of 1020 nm can be used as a beam source. Diode lasers can provide laser beams with a power of several watts up to several thousand watts. Thus, sufficient laser power can be provided for various machining and production processes.

Directly below the fiber coupler 10, the collimation optics changer 3 is located in the housing 8 of the optical module 2. A collimation optics 4 with a first focal length of, for example, 80 mm is arranged in the collimation optics changer 3 in such a way that the laser beam emerging from the fiber is collimated to a diameter of approximately 36 mm. The collimation optics changer 3 can comprise additional collimation optics 4 with focal lengths of, for example, 50 mm, 60 mm and/or 100 mm or more. This allows collimated laser beams with diameters between approx. 10 mm and 100 mm to be provided. For example, suitable types of converging lenses can be used as collimation optics 4. A collimation optics 4 can consist of a single lens or comprise a number of lenses. Material, coating and other lens properties can be selected depending on the laser wavelength and laser power used.

The collimated laser beam is directed by two deflecting mirrors 6, 7 arranged in the optical module 2 to a focusing optics 14, which focuses the laser beam. The position or orientation of the deflecting mirrors 6, 7 is preferably adjustable in each case so that the beam path of the laser beam can be adjusted automatically or manually. The correct adjustment of the laser beam can be monitored by the camera 9, for example. In particular, the deflecting mirrors 6, 7 can be adjusted controlled by the machine control. For this purpose, the deflecting mirrors 6, 7 can each be arranged on adjustable supports, which can be controlled by means of control signals via the machine control. The optical module 2 can have suitable interfaces for the releasable connection of signal lines for the machine control.

For example, the focal length of the focusing optics 14 can be between 50 mm and 500 mm. The focusing optics 14 is preferably arranged in an automatically exchangeable focusing module 13, which can be attached to the optical module 2 via a mounting mechanism 11, 16. Thus, by changing the focusing module 13, the focal length of the focusing optics 14 can also be changed fully automatically.

Seven exemplary combinations of focal lengths of the collimation optics 4 and the focusing optics 14 are shown in table 1. Table 1 also exemplarily lists resulting values of the diameters of the collimated laser beam and the focused laser beam for a fiber core diameter of 600 μm. The smaller the beam diameter, the higher the laser intensity. In particular, smaller structures can be produced with a smaller beam diameter at the focal point of the laser beam. A smaller beam diameter at the focal point can be achieved with the same focal length of the focusing optics by using a larger beam diameter of the collimated laser beam in front of the focusing optics. A larger beam diameter of the collimated laser beam has the advantage that the optical elements in the optical module 2 are exposed to a lower laser intensity. This means that the optical elements are less likely to be damaged because they are heated less, for example.

TABLE 1

Seven exemplary combinations of collimation optics focal length and focusing optics focal length:

| Size | Unit | Ex. 1 | Ex. 2 | Ex. 3 | Ex. 4 | Ex. 5 | Ex. 8 | Ex. 7 |
|---|---|---|---|---|---|---|---|---|
| Power | w | 4000 | 4000 | 4000 | 4000 | 4000 | 4000 | 4000 |
| Focal length of the collimation optics | mm | 50 | 60 | 80 | 100 | 60 | 80 | 100 |
| Diameter of the collimated beam | mm | 22 | 27 | 36 | 45 | 27 | 36 | 45 |
| Focal length of the focusing optics | mm | 300 | 300 | 300 | 300 | 200 | 200 | 200 |
| Diameter of the focused beam | mm | 3.6 | 3 | 2.3 | 1.8 | 2 | 1.5 | 1.2 |

Figure 11:
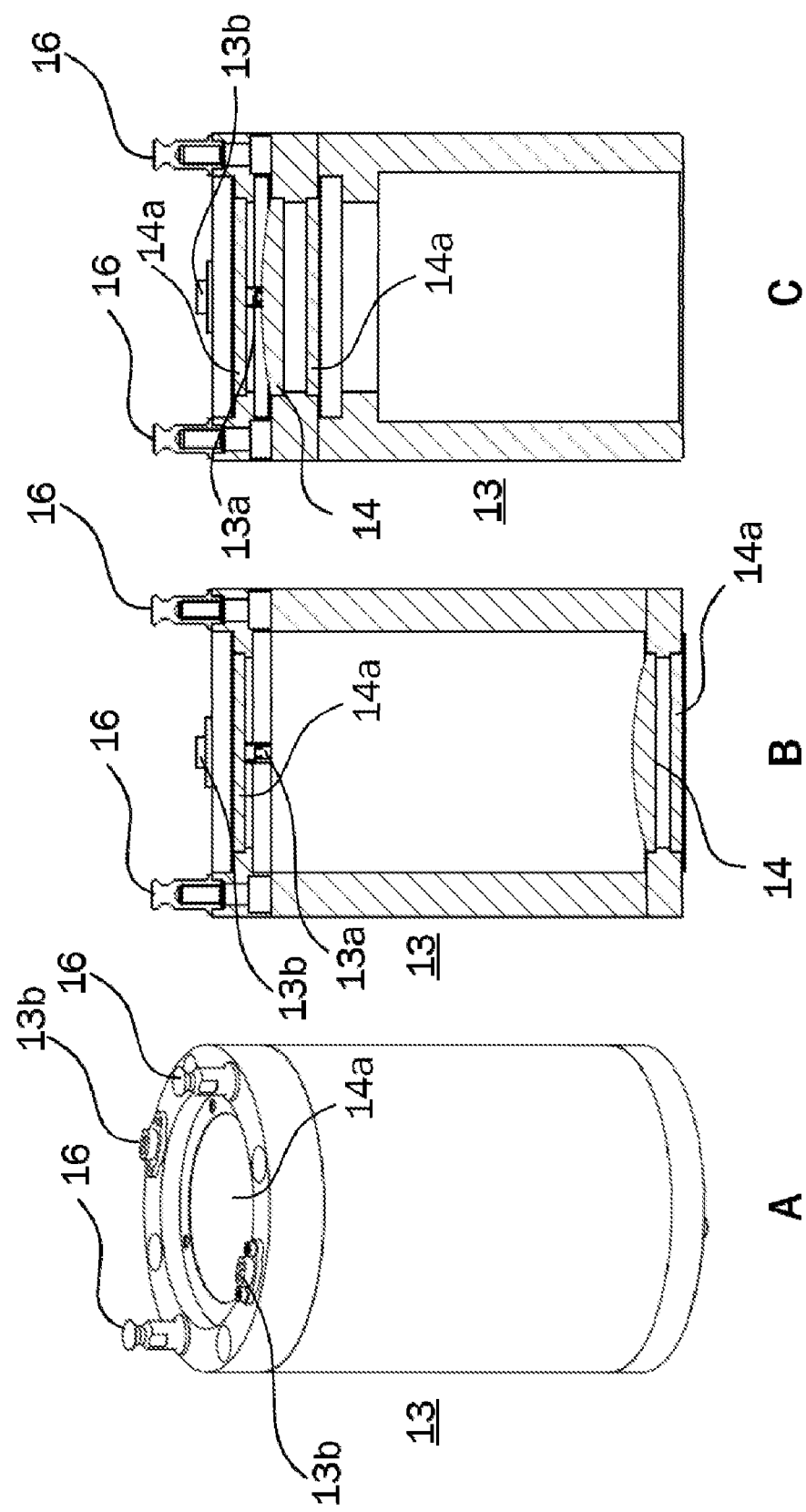
FIG. 11 (A) a perspective view of an exchangeable focusing module, (B) and (C) respective sectional views of the exchangeable focusing module with different focal lengths of the focusing optics.

An exemplary configuration of the focusing module 13 is shown in FIGS. 11A to C. FIG. 11A shows a perspective view of a focusing module 13 with an essentially cylindrical carrier housing, preferably made of a metal with the lowest possible coefficient of thermal expansion. Following the examples in Table 1, FIG. 11B shows a focusing module 13 with focusing optics 14 having a focal length of 200 mm, and FIG. 11C shows a focusing module 13 with focusing optics 14 having a focal length of 300 mm. The focusing optics 14 of the different focal lengths are arranged in the different focusing modules 13 in such a way that the resulting focal point of the laser is always at the same location.

Fasteners, for example two clamping bolts 16, are arranged at an upper edge of the focusing module 13. Fasteners 16 also serve to ensure the highest possible positioning accuracy of less than 1 mm. This is especially important for the precise beam guidance of the laser beam through the powder nozzle and to the correct working point. If deviations occur nevertheless, this can be detected by the camera 9 and corrected by the deflecting mirrors 6, 7. The focusing module 13 has at least one protective glass 14a to protect the focusing optics 14 from contamination or damage. Preferably, as shown in the sectional drawings in FIGS. 11B and C, a protective glass 14a is arranged in the focusing module 13 on each side of the focusing optics 14 to protect the focusing optics 14 from contamination or mechanical impact from both sides.

The temperature of at least one protective glass 14a can be monitored by a measuring sensor 13a. In FIGS. 11B and C, only the temperature of the upper protective glass 14a, which is first hit by the laser beam, is shown being monitored by a measuring sensor 13a. For example, a temperature-dependent resistor (NTC resistor) or a thermocouple can be used as a measuring sensor. In particular, the thermocouple can be a wire made of a platinum alloy. In a similar way, the temperature of other optical components in the optical module 2, especially the collimation optics 4, the protective glasses of the collimation optics 4, the deflecting mirrors 6, 7, and/or the focusing optics 14 can be monitored.

An analog measuring signal generated by the temperature sensor 14a is transmitted via interfaces 13b on the focusing module 13 to signal lines in the optical module 2. From there, the measurement signal is output to a machine control and converted into a temperature value so that the temperature of an optical component of the optical module 2 can be output in degrees Celsius. The measured temperature values can be shown on the display 24, for example. In the machine control, a threshold temperature value can be stored for each optical component. If the measured temperature of an optical component exceeds the stored threshold value, a warning signal can be generated. The warning signal can, for example, be issued as a warning to a user. The warning can be visually displayed, for example, on the display 24 or by means of a warning light. Additionally or alternatively, the laser can be switched off to prevent damage to the optical component.

The interfaces 13b can also be used to signal the machine control that a focusing module 13 has been successfully fastened. Accordingly, the machine control can detect that the focusing module 13 has been successfully released and deposited if a signal transmitted via the interfaces 13b is interrupted.

Figure 9A:
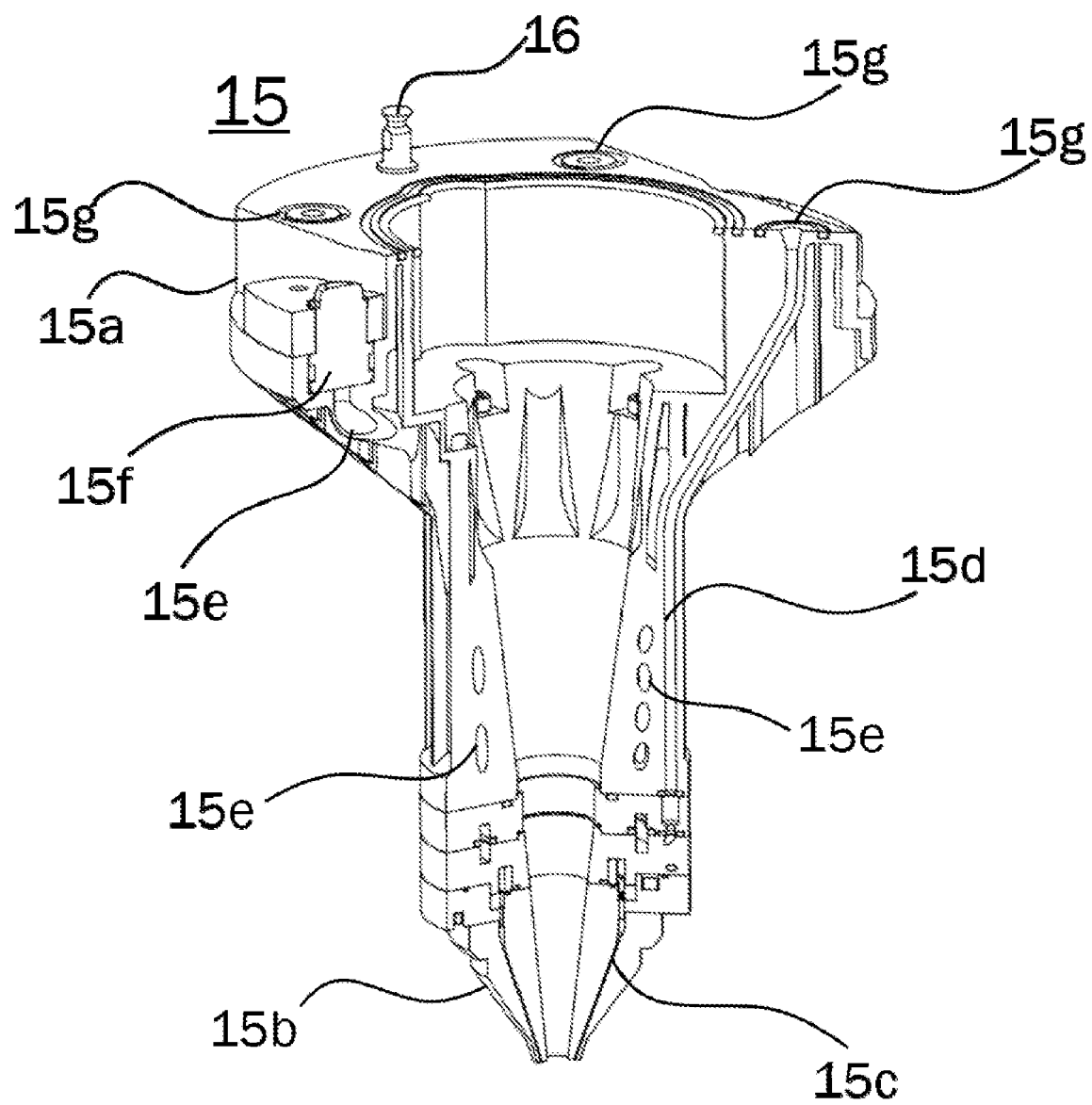
FIG. 9A: a partially sectioned perspective view.
Figure 9B:
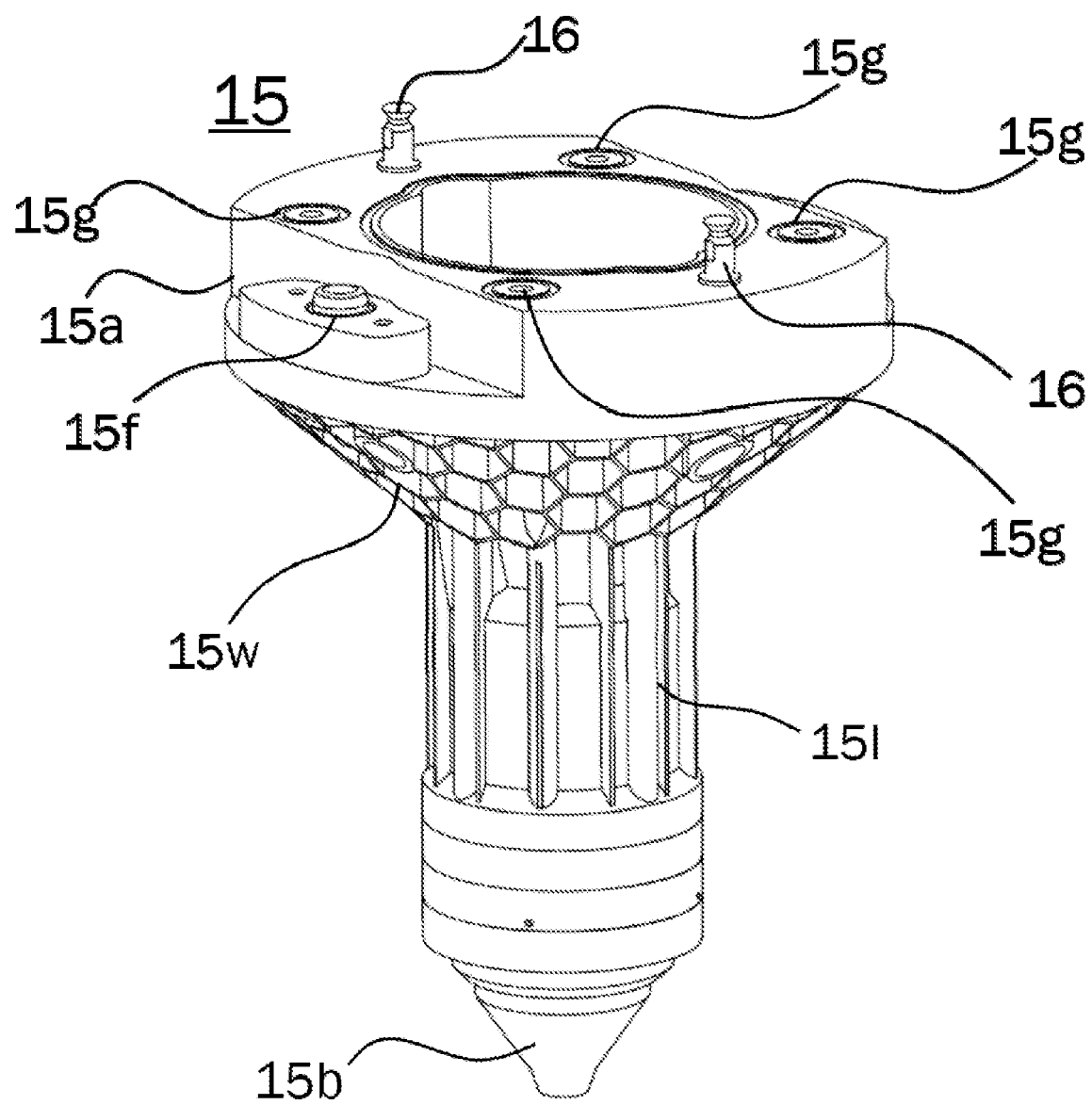
FIG. 9B: a perspective view of an exchangeable powder nozzle.

An exchangeable powder nozzle 15 can be mounted below the focusing module 13 which can be attached to the optical module 2. An exemplary configuration of the powder nozzle 15 is shown in FIGS. 9A and 9B. Similar to the focusing module 13, the powder nozzle 15 comprises fasteners 16, which can be fixed to the optical module 2 by means of corresponding receptacles 12. For example, several clamping bolts can be arranged on the powder nozzle 15 as fastening means 16. Such clamping bolts are also used in a similar way to fasten tools in conventional machine tools. The receptacles 12 on the optical module 2 can clamp these clamping bolts for mounting the powder nozzle 15 by means of a hydraulic, pneumatic, electromagnetic or spring loaded mechanism so that the powder nozzle 15 is releasably attached to the optical module 2, wherein the same position of the powder nozzle 15 can always be reached within a defined tolerance.

The powder nozzle 15 shown in FIG. 2 and FIGS. 9A and 9B comprises a flange 15a at the upper end facing the optical module 2, on which the fasteners 16, for example two clamping bolts, are arranged. An essentially cylindrical central section of the powder nozzle 15 is arranged on the flange 15a. At the lower end of the central section, a substantially conical powder nozzle tip 15b is arranged. The middle section of the powder nozzle 15, together with the flange 15a, can be used advantageously as a carrier with feeders for coolant and material powder, to which the powder nozzle tip 15b can be releasably attached. This allows the powder nozzle tip 15b to be changed.

Connections 15f, 15g or interfaces for the supply of a coolant or a material powder are arranged at the flange 15a of the powder nozzle 15. The connections 15f for the coolant can be configured as quick couplings, for example, which automatically connect to the corresponding lines on the optical module 2 when the powder nozzle 15 is attached to the optical module 2. The inlets 15g for the material powder can be configured as simple openings with a sealing ring. When mounting the powder nozzle 15 to the optical module 2, the inlets with the sealing rings are pressed against corresponding outlets on the optical module in such a way that a gas-tight connection is created.

The inlets 15g for material powder are each connected to channels 15d for the material powder which run through the powder nozzle 15 to the tip 15b of the powder nozzle 15. An annular gap 15c is formed in the tip 15b of the powder nozzle 15, the gap width of which can taper in the flow direction to achieve a nozzle effect. The transition between material powder channels 15d and annular gap 15c is formed such that a circumferentially uniform distribution of the material powder is established. For example, a plurality of holes can be provided in a transition from material powder channels 15d to the annular gap 15c. The holes can cause an even distribution of the material powder P in the annular gap 15c. The stream of material powder P can have the form of a cone coaxially aligned with the focal point of the laser beam, as indicated by the illustration in FIG. 10.

The powder nozzle tip 15b can be releasably attached to the powder nozzle 15 so that it can be exchanged, for example, if it is damaged or deformed by heat. In case of a multi-part construction of the powder nozzle 15, the powder nozzle tip 15b can also be made of a different, more heat-resistant and/or harder material than the remaining part of the powder nozzle 15. For example, differently dimensioned powder nozzle tips 15b can be used for different laser beam diameters. Furthermore, differently dimensioned annular gaps 15c with different opening widths can be formed in exchangeable powder nozzle tips 15b. Accordingly, different powder nozzles 15 with differently dimensioned powder nozzle tips 15b can be kept in the machine 1 so that the entire powder nozzle 15 can be exchanged, if necessary. For example, the diameter of the lower opening of the powder nozzle tip 15b facing the workpiece can be 1 mm, 2 mm, 3 mm, 4 mm or 5 to 8 mm. The exchange of the powder nozzle tips 15b is preferably done manually, whereas the change of the entire powder nozzle 15 can be done fully automatically as described below.

The powder nozzle 15 has at least two couplings 15f for coolant which are preferably configured as quick couplings. One coupling 15f serves as the connection for the coolant flow from the optical module 2, the other coupling 15f serves as the connection for the coolant return to the optical module 2. The coolant connections 15f are fluidically connected with coolant channels 15e in the powder nozzle 15 which are illustrated in the partially sectional view of FIG. 9A. For example, the coolant channels 15e can be arranged annularly, spirally or helically around the laser beam opening to ensure uniform cooling of the powder nozzle 15.

An essentially cylindrical recess for the focusing module 13 is formed inside the flange 15a. In case the focusing module 13 and the powder nozzle 15 are attached to the optical module 2, the lower end of the focusing module 13 is located within the recess in the powder nozzle 15. Thereby, the focusing module 13 and the powder nozzle 15 are arranged coaxially to each other and to the laser beam at the optical module 2.

Due to the plurality of channels for coolant 15e and channels for material powder 15d, as well as its axial opening tapering in the axial direction towards the laser focal point, the powder nozzle 15 has a very complex shape. Such a complex shape can be produced, for example, by a laser deposition welding process in a machine 1 according to the invention. In order to be able to carry out the manufacturing process of the powder nozzle 15 by laser deposition welding in the shortest possible time and with the greatest possible saving of material, the essentially cylindrical middle section of the powder nozzle 15 can be constructed with the thinnest possible wall thickness. In order to increase the mechanical strength of the powder nozzle 15, the wall can be reinforced by lamellas 151. Similarly, the transition between the flange 15a and the middle section of the powder nozzle 15 can be manufactured in a material-saving manner, for example by using a honeycomb structure 15w as shown in FIG. 9B, which offers high mechanical strength with low material consumption.

The flange 15a and the middle section of the powder nozzle 15 can be made of aluminum or steel, for example. The diameter of the flange 15a can be approximately 150 mm to 170 mm, preferably 160 mm. The total length of the powder nozzle 15 can be approximately 125 mm to 145 mm, preferably 135 mm. When using focusing optics 14 with shorter focal lengths, correspondingly shorter powder nozzles with a length of less than 125 mm, for example 100 mm to 90 mm, can also be used. If the focusing optics 14 with longer focal lengths are used, correspondingly longer powder nozzles with a length of more than 145 mm, for example 150 mm to 200 mm or even 300 mm, can also be used. The diameter of the middle section of the powder nozzle can be approximately 60 mm to 70 mm, preferably 65 to 67 mm. Preferably, the powder nozzle 15 can also be designed to be more compact in order to reduce the risk of collision with the workpiece 30.

For example, the powder nozzle 15 can be exchanged as described below. The partition wall between the process chamber 22 and the tool chamber located laterally to it is pulled open. Using the adjusting axis 25b, the lower part of the tool changer 25 with the powder nozzles 15 is moved into the process chamber 22. The adjusting axes 18 move the optical module 2 to the position where the tool changer 25 with the multitude of powder nozzles 15 is located. For depositing a powder nozzle 15 attached to the optical module 2, a depositing position of the tool changer 25 must be free in contrast to FIG. 7 and FIG. 8. By opening the receptacles 12 on the optical module 2, the fasteners 16 of the powder nozzle 15 are released so that the powder nozzle 15 is released from the optical module 2 and can be deposited at a free depositing position of the tool changer 25.

Subsequently, the optical module 2 is moved to another position of the tool changer 25, where another powder nozzle 15, which has a larger or smaller dimension in axial direction, is located. The optical module 2 is then moved by means of the adjusting axes 18 so that the fasteners 16 of the further powder nozzle 15 engage in the receptacles 12 on the optical module 2. By closing the receptacles 12, the powder nozzle 15 can be attached to the optical module 2 and removed by the tool changer 25.

The powder nozzle 15 can be changed automatically, especially if the focal length of the laser beam is changed by changing the focusing optics 14. Since the powder nozzle 15 is to guide the material powder to the location of the focal point of the laser beam, the axial length of the powder nozzle 15 must be selected according to the focal length of the laser beam. As listed in Table 1, the focal length of the focusing optics 14 can be 200 mm or 300 mm, for example. Correspondingly, powder nozzles 15 can be provided in the tool changer 25 of the machine 1 which guide material powder to a focal point 200 mm or 300 mm away from the focusing optics 14, for example.

Via the powder nozzle 15, a material powder can be provided at the operating point of the machine 1, thus in the immediate vicinity of the focal point of the laser beam. For this purpose, the powder nozzle 15 has one or more channels through which the material powder is guided. When the powder nozzle 15 is attached to the optical module 2, the channels for the material powder are connected to the corresponding lines in the optical module 2. In order to connect the channels and the lines, the powder nozzle 15 or the optical module 2 each have suitable interfaces. Furthermore, the powder nozzle 15 has one or more cooling channels in which a fluid coolant, especially water, can circulate to cool the powder nozzle 15. The optical module 2 has appropriate lines for supplying and removing the coolant as well as interfaces for connecting the lines to the cooling channels of the powder nozzle 15.

In addition, the powder nozzle 15 can supply a protective gas to the operating point of the machine 1 so that undesired reactions can be suppressed as far as possible when melting the material powder at the focal point of the laser beam. The protective gas serves in particular to displace oxygen from the air. In particular, inert gases such as argon can be used as protective gas. The optical module 2 has appropriate lines for supplying the protective gas. The shielding gas can also be supplied together with the material powder as carrier gas. Thus the protective gas serves to prevent a reaction with atmospheric oxygen on the one hand and to convey the material powder on the other hand.

When the powder nozzle 15 is automatically replaced, the cooling lines of the optical module 2 are automatically connected or disconnected with the cooling channels of the powder nozzle 15 via the corresponding interfaces. Accordingly, the lines for material powder in the optical module 2 are also automatically connected or disconnected with the material powder channels in the powder nozzle 15 via the corresponding interfaces. The corresponding interfaces for the lines and channels can be configured in a releasable manner and, for example, can be controlled via hydraulics or pneumatics.

An automatic change of the focusing module 13 can be carried out in a similar way to the automatic change of the powder nozzle 15. In this case, the upper part of the tool changer 25 with the focusing modules 13 is also moved into the process chamber 22 by means of the adjusting axis 25a. To change the focusing module 13, however, a powder nozzle 15 attached to the optical module 2 must first be released. This is done as described above by placing the powder nozzle 15 in a free position on the tool changer 25. The adjusting axes 18 then move the optical module 2 to a position where the tool changer 25 with the multitude of focusing modules 13 is located. The focusing module 13 attached to the optical module 2 can be released by opening the receptacles 11 on the optical module 2 so that the focusing module 13 can be released from the optical module 2 and deposited at a free depositing position of the tool changer 25. Another focusing module 13 can then be attached to the optical module 2. For this purpose, the optical module 2 is moved in such a way that the fasteners 16 of the focusing module 13 engage in the receptacles 11 on the optical module 2. The receptacles 11 on the optical module 2 can now clamp the fasteners 16, e.g. via a hydraulic, pneumatic or spring-loaded mechanism, to attach the focusing module 13 to the optical module 2. The tool changer 25 can then be moved back into the releasable tool chamber and machining of the workpiece can be started or continued.

The required traverse paths of the adjusting axes 18, 25a, 25b can be stored in a memory of the machine control so that the change of the focusing module 13 or the powder nozzle 15 can be carried out fully automatically. Changing the focusing module 13 or the powder nozzle 15 can thus also be integrated into a machining process. Depending on the desired size of the structures to be produced on the workpiece 30 or the molded body 30, a suitable diameter of the laser beam is selected at the focal point. The smaller the diameter of the laser beam at the focal point, the smaller structures can be produced. As shown in Table 1, the diameter of the laser beam is determined by the focal length of the focusing optics 14 and the collimation optics 3, so that a suitable combination of collimation optics 4 and focusing optics 14 can be selected for each processing operation. Depending on the selected collimation optics 4 and focusing optics 14, a suitable powder nozzle 15 is selected and attached to the optical module 2. On the one hand, the opening of the powder nozzle tip 15b must be large enough so that the laser beam L can pass unhindered. On the other hand, the opening of the powder nozzle tip 15b should be small enough to cause a favorable and uniform flow of the material powder P through the annular gap 15c to the focal point of the laser beam L. According to the selected structure size, a suitable collimation optics 4 is accordingly set on the collimation optics changer 3 and a suitable focusing module 13 and a corresponding powder nozzle 15 are attached to the optical module 2.

The first deflecting mirror 6 comprises means for cooling and monitoring the temperature of the mirror 6. The second deflecting mirror 7 is a dichroic mirror which also has means for cooling and monitoring the temperature of the mirror 7. The dichroic mirror 7 is reflective for the wavelength of the laser beam, which is in the infrared spectral range, for example. For visible light, however, the dichroic mirror can be transparent. Behind the dichroic mirror 7, a camera 9 can be arranged to monitor the production process. The camera 9 is arranged with the direction of view along the laser beam through the dichroic mirror and through the focusing optics 14 to the focal point of the laser beam. Thus, the camera 9 can be used to monitor the working point on the workpiece or the molded part to be produced.

The optical module 2 comprises interfaces for receiving control signals from a machine control. The control signals can, for example, cause the collimation optics changer 3 to perform a collimation optics change. The interfaces can also be used to transmit the measured temperatures of the collimation optics 4, the deflecting mirrors 6, 7 or other optical components to the machine control.

Figure 3:
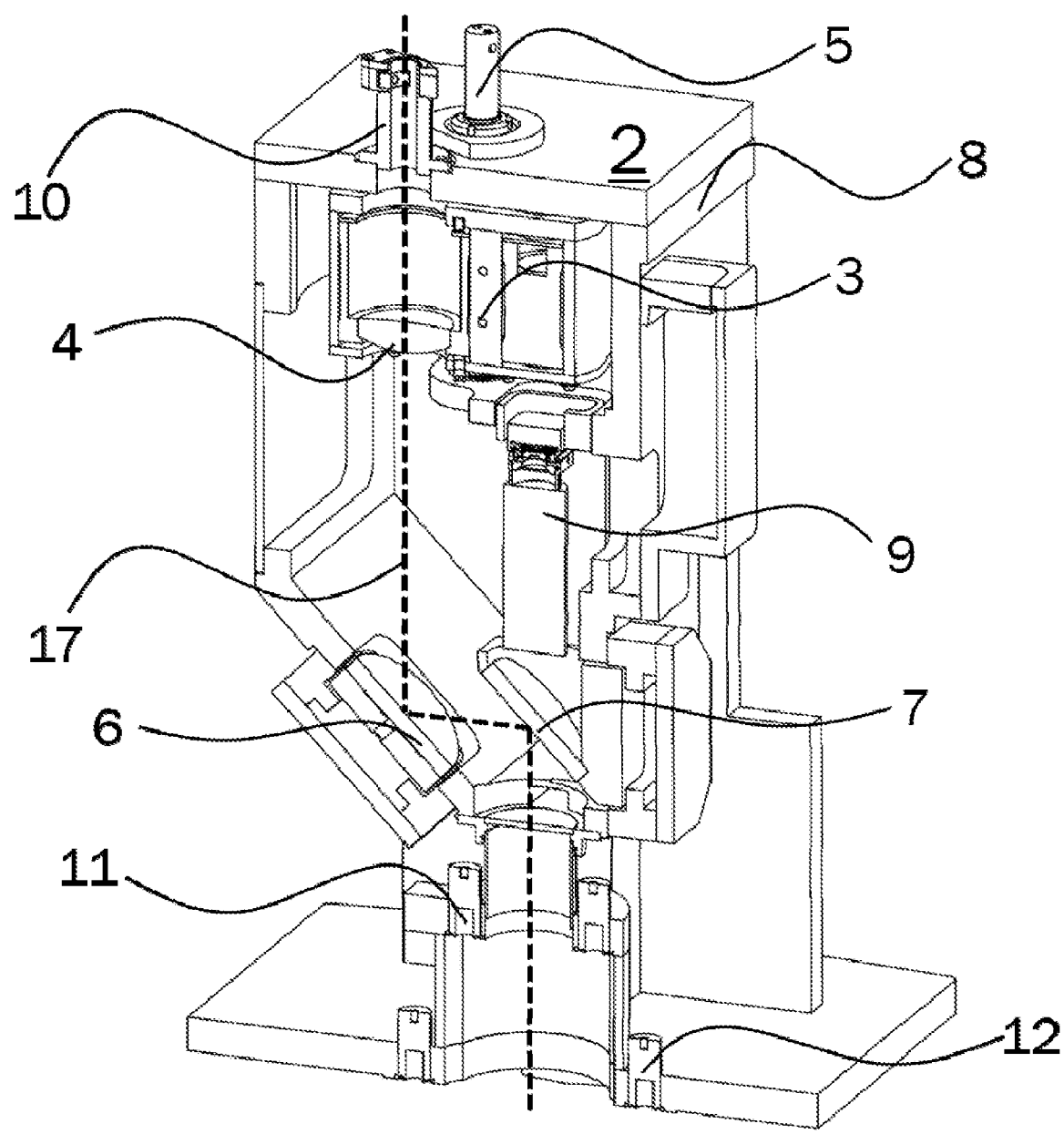
FIG. 3: a further perspective sectional view of the embodiment of the optical module shown in FIG. 2.

FIG. 3 shows a further sectional view of the inventive optical module 2 according to the embodiment. The section of the view shown runs through the same plane as in FIG. 2, but the viewing direction is from the opposite side to the optical module 2. A beam path 17 of the laser beam is drawn as a dotted line. In the view shown in FIG. 3, both a rotation axis 5 of the collimation optics changer 3 and the fiber coupler 10 are visible.

Figure 4:
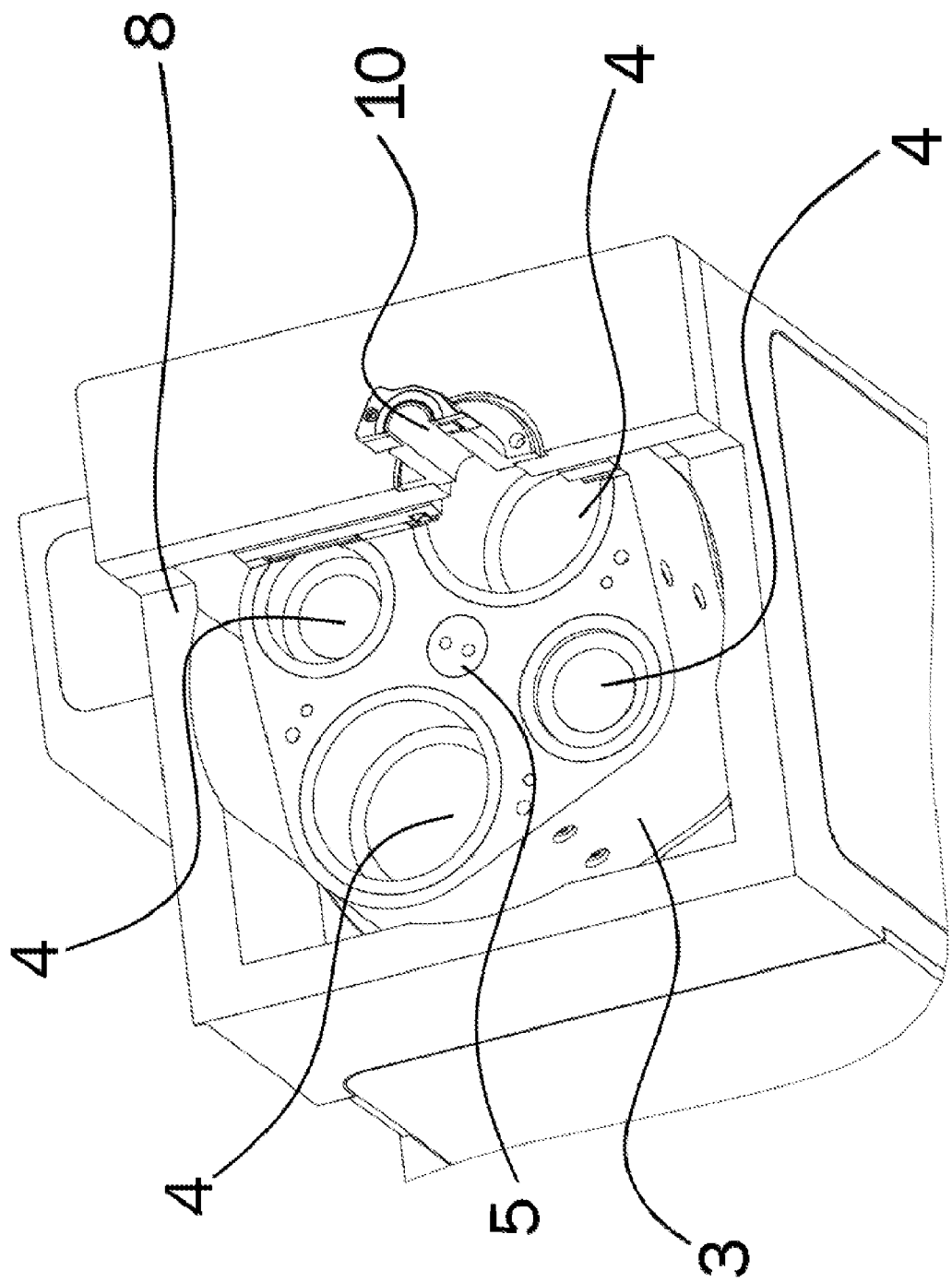
FIG. 4: a perspective sectional view of an upper area of the optical module according to the invention according to the embodiment.
Figure 5:
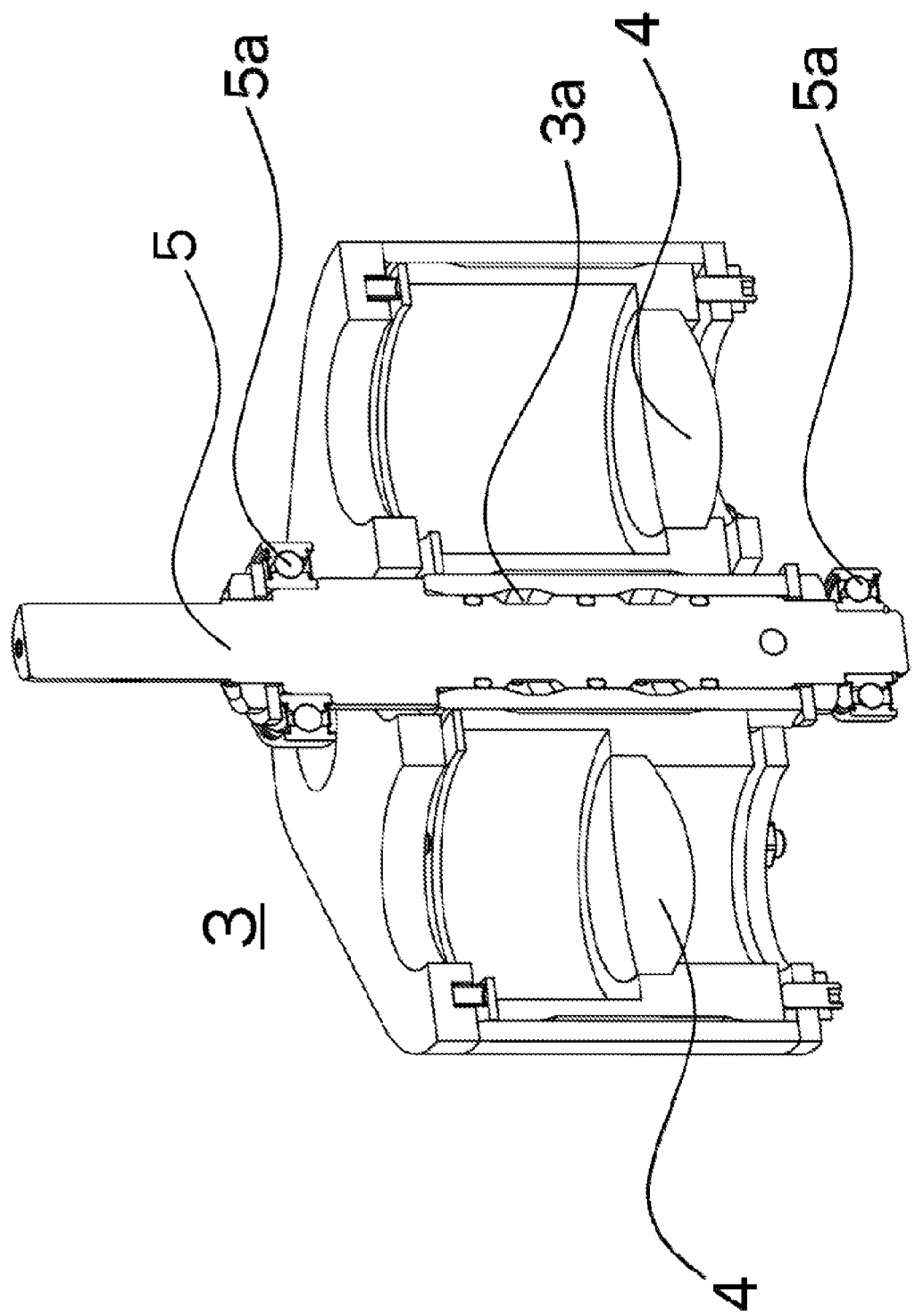
FIG. 5: a longitudinal section of a collimation optics changer according to the invention.
Figure 6:
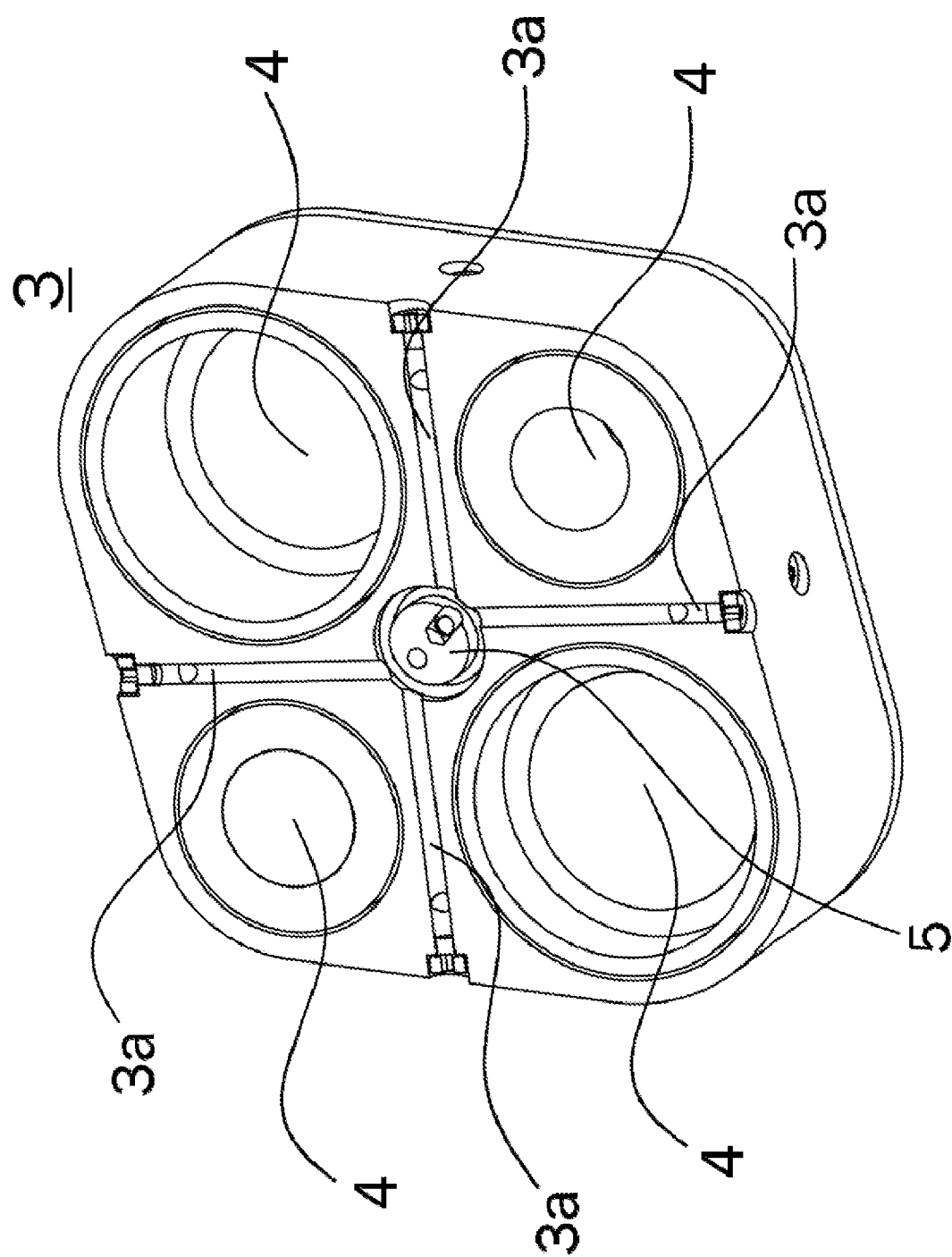
FIG. 6: a cross-section of the collimation optics changer according to the invention.

Further details of the collimation optics changer 3 according to the invention are described by means of the sectional views shown in FIGS. 4 to 6. FIG. 4 shows a quarter section in a perspective view of an upper part of the optical module 2. Inside the housing 8 the collimation optics changer 3 is shown with four collimation optics 4. The collimation optics changer 3 of the embodiment shown is configured as a turret which is mounted so as to be rotatable about a vertical axis of rotation 5. An actuator not shown is operatively connected to the axis of rotation 5 so that the collimation optics changer 3 can be rotated about the axis of rotation 5 by controlling the actuator so that a change of the collimation optics 4 can be achieved. The axis of rotation 5 is shown centrally in the cross-section. The collimation optics 4 which is located below the fiber coupler 10, is located in the beam path of the laser. The interior of the housing 8 of the optical module 2 is configured such that the collimation optics changer 3 can rotate in it.

An electric motor, in particular a servo motor or stepper motor, can be used as an actuator for rotating the collimation optics changer 3 about the axis of rotation 5. The correct adjustment of the collimation optics changer 3 can be monitored in particular by the camera 9 located in the optical module 2, for example by observing the location of the focal point of the laser beam. The laser beam should hit the collimation optics 4 and the other optical components in the beam path as centrally as possible.

As shown in the cross-sectional view in FIG. 6, the collimation optics changer 3 of the embodiment has a rounded diamond shape, which is due, among other things, to the lens diameters of the collimation optics 4 used. FIG. 6 also shows that the collimation optics 4 are arranged in different positions along the Z-axis, which is parallel to the axis of rotation 5, according to their focal length. The axial position of the collimation optics 4 can be adjusted. Thus, the lens position can be pre-adjusted before the collimation optics changer 3 is installed in the optical module 2 so that the laser beam is correctly collimated by each installed collimation optics 4.

FIG. 5 shows a longitudinal section through the rotation axis 5 of the collimation optics changer 3. In this sectional view, bearings 5*a* are shown at the top and bottom, by means of which the rotation axis 5 is rotatably supported. A flange at an upper part of the rotation axis 5 is used for releasably attaching the rotation axis 5 to the housing 8 of the optical module 2. The lower bearing 5*a* is releasably mounted to a carrier element arranged parallel to the cover in the housing 8. This construction allows an easy exchange of the collimation optics changer 3 if necessary.

The collimation optics 4 are each releasably mounted in the collimation optics changer 3 so that individual collimation optics 4 can be exchanged quickly and easily if necessary. Furthermore, a protective glass is arranged above each collimation optics 4 which can protect the collimation optics 4 from contamination and mechanical effects. Thus, the use of a protective glass prevents significantly more expensive lenses from being damaged or contaminated and thus having to be exchanged. The protective glasses are also releasably attached in the collimation optics changer 3 so that individual protective glasses can be exchanged easily and quickly if necessary. The protective glasses can have an anti-reflection coating to avoid disturbing reflections of laser light back into the laser.

The collimation optics changer 3 according to the embodiment shown in FIGS. 4 to 6 has four positions for releasable attachment of collimation optics 4. These four positions are configured as cylindrical openings in a solid housing which is preferably made of a metal, such as an aluminum or steel alloy, or of a ceramic material. The collimation optics 4 can also be pre-assembled in cylindrical mounts so that the collimation optics 4 with their mounts can be easily inserted into the cylindrical openings and fixed therein. Deviating from the embodiment shown, the collimation optics changer 3 can also have more than four collimation optics 4. Conceivable are, for example, configurations with two, three, five, six, seven or more collimation optics 4.

The collimation optics changer 3 may comprise means for cooling the collimation optics 4. As shown in FIG. 6, the collimation optics changer 3 comprises a solid housing. The housing can be milled from a single piece of metal, for example. The cooling of the collimation optics 4 can be done by cooling the housing of the collimation optics changer 3. For this purpose, the housing of the collimation optics changer 3 can have a plurality of cooling channels 3*a* through which a suitable fluid coolant flows. By cooling the collimation optics changer 3, damage to the collimation optics 4 caused by temperature fluctuations can be prevented. Furthermore, cooling can reduce a thermal lens effect.

FIGS. 5 and 6 show several cooling channels 3*a* in the collimation optics changer 3. Two axial cooling channels run in an axial direction through the axis of rotation 5 of the collimation optics changer 3, one of these two axial cooling channels serves as a supply line for the coolant and the other as a return line for the coolant to be discharged so that the coolant can circulate in a circuit through the collimation optics changer 3*a*. In the sectional view of FIG. 6, four radial cooling channels 3*a* of the collimation optics changer 3 are shown. The radial cooling channels 3*a* run from the axial cooling channels in the axis of rotation 5 radially outwards through the collimation optics changer 3. In a second plane parallel to the sectional plane, further radial cooling channels 3*a* run through the collimation optics changer 3. In order to allow coolant circulation, the radial cooling channels 3*a* of the two planes are in flow connection with each other via cooling channels running perpendicular to the sectional plane through the housing of the collimation optics changer 3. The coolant can thus cool the collimation optics changer 3. In particular, the housing of the collimation optics changer 3 is cooled. The collimation optics 4 are attached to the housing of the collimation optics changer 3. This allows heat transfer between the collimation optics 4 and the housing of the collimation optics changer 3 so that cooling the housing via the cooling channels 3*a* causes cooling of the collimation optics 4. The coolant can be supplied to the optical module 2 via coolant lines. The coolant lines can be releasably connected via suitable connections to coolant channels in the optical module 2 or in or on the optical components.

Figure 10:
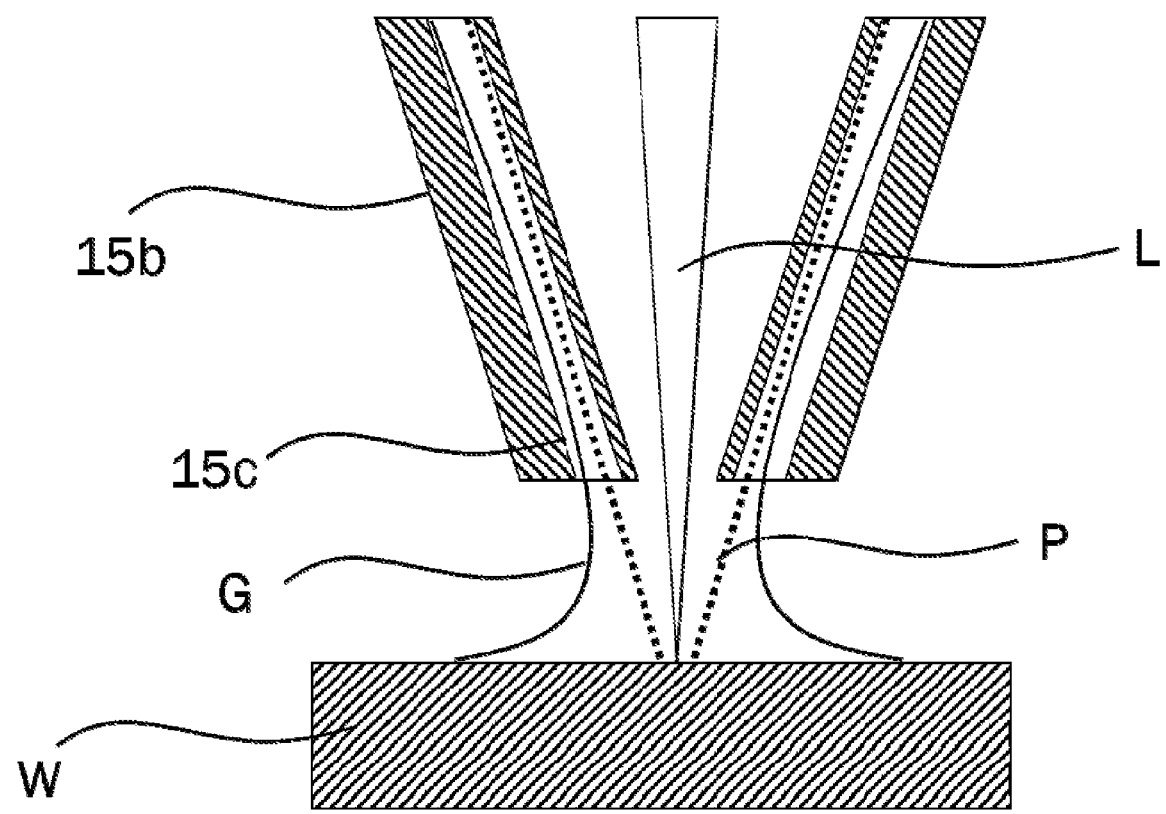
FIG. 10 an illustration of the working principle of laser deposition welding.

The operating principle of laser deposition welding is illustrated in FIG. 10. FIG. 10 shows the tip 30 of a powder nozzle 15 near a workpiece W to be processed. A focused laser beam L runs coaxially to the powder nozzle 15 and is focused to an operating point on the workpiece W. The material powder P is guided coaxially to the laser beam L through the powder nozzle 15 to the focal point of the laser beam L on the workpiece W. A protective or carrier gas G also flows through the powder nozzle 15 and transports the material powder P. The protective gas G, for example argon, also serves to prevent undesired reactions of the heated material powder P or the workpiece W with atmospheric oxygen.

The features disclosed in the above description, claims and drawings may be relevant to the realization of the invention in its various configurations, either individually or in any combination.

LIST OF REFERENCE SIGNS

1 laser machine tool
2 optical module
3 collimation optics changer
3*a* cooling channel
4 collimation optics
5 rotation axis 5a storage
6 first deflecting mirror
7 second deflecting mirror (dichroic mirror)
8 housing
9 camera
10 fiber coupler
11 receptacle for focusing optics
12 receptacle for powder nozzle
13 focusing module
13a thermocouple
13b interface of the thermocouple
14 focusing optics
14a protective glass
15 powder nozzle
15a powder nozzle flange
15b powder nozzle tip
15c annular gap
15d material powder channel
15e cooling channel
15f coolant coupling
15g material powder inlet
15 lamellas
15 honeycomb structure
16 clamping bolt
17 beam path of the laser
18 adjusting axes of the tool
19 adjusting axes of the workpiece table
20 workpiece table
21 machine frame
22 process chamber
23 process chamber door
24 display
25 tool changer
25a adjusting axis of the focusing optics changer
25b adjusting axis of the powder nozzle changer
30 workpiece
L laser beam
W workpiece
P workpiece powder
G protective gas and/or carrier gas

The invention claimed is:

1. An optical module for a machine for machining workpieces and/or for producing molded bodies by location-selective solidification of material powder to form connected regions by means of a focused laser beam, comprising:
a housing with means for releasably attaching the optical module to the machine; and
a collimation optics changer releasably arranged in the housing having at least two collimation optics which can be moved into a beam path of the laser beam for collimating the laser beam,
wherein the collimation optics changer is configured to be rotatable in the housing about an axis of rotation; and
wherein the collimation optics changer comprises:
a solid housing;
a mechanism for automatically changing the collimation optics;
a plurality of cooling channels in the solid housing of the collimation optics changer, through which a fluid coolant flows for cooling the collimation optics; and
means for measuring the temperature of the collimation optics,
wherein a first axial cooling channel serves as a supply line for the coolant and a second axial cooling channel serves as a return line for the coolant run in an axial direction through the axis of rotation, and
wherein the first axial cooling channel and the second axial cooling channel are connected to radial cooling channels running radially through the solid housing of the collimation optics changer.

2. The optical module according to claim 1, wherein the collimation optics changer comprises a turret with a plurality of collimation optics.

3. The optical module according to claim 1, wherein a powder nozzle of the optical module comprises means for connecting supply lines for a sealing gas.

4. The optical module according to claim 1, wherein the optical module comprises receptacles for fastening clamping bolts of an automatically exchangeable focusing lens module.

5. The optical module according to claim 1, wherein the optical module comprises receptacles for fastening clamping bolts of an automatically exchangeable powder nozzle.

6. The optical module according to claim 1, wherein the optical module comprises means for connecting an optical fiber for providing a laser beam.

7. The optical module according to claim 1, wherein the optical module comprises a camera for monitoring a machining process.

8. A machine for machining workpieces and/or for producing molded bodies by location-selective solidification of material powder to form connected regions by means of a laser beam, wherein the machine has an optical module according to claim 1.

* * * * *